(12) United States Patent
Wong et al.

(10) Patent No.: US 8,645,391 B1
(45) Date of Patent: Feb. 4, 2014

(54) ATTRIBUTE-VALUE EXTRACTION FROM STRUCTURED DOCUMENTS

(75) Inventors: Yuk Wah Wong, Pittsburgh, PA (US); Dominic Widdows, Pittsburgh, PA (US); Thomas David Lokovic, Murrysville, PA (US); Kamal P. Nigam, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 572 days.

(21) Appl. No.: 12/497,176

(22) Filed: Jul. 2, 2009

Related U.S. Application Data

(60) Provisional application No. 61/078,303, filed on Jul. 3, 2008, provisional application No. 61/078,721, filed on Jul. 7, 2008.

(51) Int. Cl.
*G06F 7/00* (2006.01)

(52) U.S. Cl.
USPC ........... 707/748; 707/749; 707/758; 715/206; 715/234

(58) Field of Classification Search
USPC ........... 707/999.005, 748, 749, 758; 715/206, 715/234
See application file for complete search history.

(56) References Cited

U.S. PATENT DOCUMENTS

| | | | |
|---|---|---|---|
| 6,073,130 A * | 6/2000 | Jacobson et al. | 707/999.005 |
| 6,101,515 A * | 8/2000 | Wical et al. | 715/234 |
| 6,460,034 B1 * | 10/2002 | Wical | 707/999.005 |
| 7,769,579 B2 | 8/2010 | Zhao et al. | |
| 7,831,545 B1 | 11/2010 | Betz | |
| 2005/0256865 A1 | 11/2005 | Ma et al. | |
| 2006/0123000 A1 | 6/2006 | Baxter et al. | |
| 2007/0022085 A1 * | 1/2007 | Kulkarni | 707/1 |
| 2007/0078670 A1 | 4/2007 | Dave et al. | |
| 2007/0143317 A1 | 6/2007 | Hogue et al. | |
| 2007/0150800 A1 | 6/2007 | Betz et al. | |
| 2007/0198499 A1 | 8/2007 | Ritchford et al. | |
| 2007/0203868 A1 | 8/2007 | Betz | |
| 2007/0282892 A1 * | 12/2007 | Probst et al. | 707/102 |
| 2010/0114716 A1 | 5/2010 | Heilig et al. | |

FOREIGN PATENT DOCUMENTS

WO WO 2006/132793 A2 12/2006

OTHER PUBLICATIONS

Eugene Agichtein et al., "Question Answering over Implicitly Structured Web Content", In Proceedings of the 2007 IEEE/WIC/ACM International Conference on Web Intelligence, Silicon Valley, USA, Nov. 2007, pp. 18-25.

(Continued)

*Primary Examiner* — Hosain Alam
*Assistant Examiner* — Jieying Tang
(74) *Attorney, Agent, or Firm* — Fish & Richardson P.C.

(57) ABSTRACT

Methods, systems, and apparatus, including computer programs encoded on computer storage media, for attribute-value extraction from structured documents. In one aspect, a method includes obtaining an initial attribute whitelist, extracting candidate attributes from a first collection of documents, and grouping the candidate attributes. The method further includes calculating a score for each unique attribute in the candidate attributes, generating an expanded attribute whitelist including the initial attributes and each unique attribute having a score that satisfies a threshold, and using the expanded attribute whitelist to identify valid attribute-value pairs. In another aspect, a method includes extracting candidate attribute-value pairs from a collection of documents and identifying one or more features for each candidate attribute-value pair. The method further includes filtering out non valid attribute-value pairs.

27 Claims, 8 Drawing Sheets

(56) References Cited

OTHER PUBLICATIONS

Luigi Arlotta et al. "Automatic Annotation of Data Extracted from Large Web Sites", In Proceedings of the International Workshop on the Web and Databases (WebDB 2003), San Diego, California, Jun. 2003, 6 pages.

Michael J. Cafarella et al., "Uncovering the Relational Web", In Proceedings of the 11th International Workshop on Web and Databases (WebDB 2008), Vancouver, Canada, Jun. 2008, 7 pages.

Koby Crammer et al., "Online Passive-Aggressive Algorithm", Journal of Machine Learning Research, 2006, at 7, pp. 551-585.

Wolfgang Gatterbauer et al., "Towards Domain-Independent Information Extraction from Web Tables", In Proceedings of the Sixteenth International World Wide Web Conference (WWW 2007), Banff, Canada, May 2007, pp. 71-80.

Kristina Lerman et al., "Using the Structure of Web Sites for Automatic Segmentation of Tables", In Proceedings of the ACM SIGMOD International Conference on Management of Data, Paris, France, Jun. 2004, 12 pages.

Yalin Wang et al., "A Machine Learning Based Approach for Table Detection on the Web", In Proceedings of the International World Wide Web Conference (WWW 2002), Honolulu, Hawaii, May 2002, pp. 242-250.

Guizhen Yang et al., "On Precision and Recall of Multi-Attribute Data Extraction from Semistructured Sources", In Proceedings of the 3rd IEEE International Conference on Data Mining (ICDM 2003), Melbourne, Florida, Dec. 2003, 8 pages.

Minoru Yoshida et al., "Extracting Ontologies from World Wide Web via HTML Tables", In Proceedings of the Pacific Association for Computational Linguistics (PACLING 2001), 10 pages.

Shubin Zhao et al., "Corroborate and Learn Facts from the Web," Proceedings of the 13$^{th}$ ACM SIGKDD International Conference on Knowledge Discovery and Data Mining, Aug. 2007, pp. 995-1003.

Jun Zhu et al., "Webpage Understanding: an Integrated Approach", In Proceedings of the 13th ACM SIGKDD International Conference on Knowledge Discovery and Data Mining (KDD 2007), San Jose, California, Aug. 2007, pp. 903-912.

* cited by examiner

ATTRIBUTE-VALUE EXTRACTION FROM STRUCTURED DOCUMENTS

CROSS-REFERENCE TO RELATED APPLICATIONS

This application claims the benefit under 35 U.S.C. §119(e) of U.S. Provisional Patent Application No. 61/078,303 titled "Scalable Attribute-Value Extraction from Semi-Structured Text," filed Jul. 3, 2008 and U.S. Provisional Patent Application No. 61/078,721 titled "Scalable Attribute-Value Extraction from Semi-Structured Text," filed Jul. 7, 2008, both of which are incorporated here by reference.

BACKGROUND

This specification relates to extracting attribute-value pairs from structured documents. In general, structured documents are documents with underlying structure that defines how the data in the document is interpreted or displayed (e.g., Hypertext Markup Language (HTML) or Extensible Markup Language (XML) documents). The structure of a document is typically defined by various structural elements (e.g., headings, paragraphs, tables, etc.). For example, a structured document can simply define the layout of data. Structured documents need not have structure associated with external sources (e.g., associated with a database scheme that defines the meaning of the data in the document).

Attribute-value pairs are made up of an attribute and a value for the attribute. An attribute is a descriptor for a property of an entity, for example, the "population" of a city, the "birthday" of a person, or the "price" of a piece of chocolate cake. Each attribute-value pair associates an attribute for an entity with a value for the property described by the attribute, for example, the population of Mountain View, Calif. is 70,708, Abraham Lincoln's birthday is February 12, and the price of a piece of chocolate cake is $3.29.

SUMMARY

This specification describes technologies relating to extracting attribute-value pairs from structured documents.

In general, one aspect of the subject matter described in this specification can be embodied in methods that include the actions of obtaining an initial attribute whitelist, the initial attribute whitelist including one or more initial attributes; extracting a plurality of candidate attributes from a first collection of documents; grouping the candidate attributes according to both a particular document from which each candidate attribute was extracted and a corresponding structure of that document; calculating a score for each unique attribute in the candidate attributes, where the score reflects a number of groups containing the unique attribute and an attribute on the initial attribute whitelist; generating an expanded attribute whitelist, the expanded attribute whitelist including the initial attributes and each unique attribute having a respective score that satisfies a threshold; and using the expanded attribute whitelist to identify valid attribute-value pairs. Other embodiments of this aspect include corresponding systems, apparatus, and computer programs products recorded on computer storage devices, each configured to perform the operations of the method.

These and other embodiments can each optionally include one or more of the following features. Using the expanded attribute whitelist to identify valid attribute-value pairs can include extracting a plurality of candidate attribute-value pairs from a second collection of documents, the candidate attribute-value pairs identified according to a respective structure of one or more of the documents; and generating a plurality of valid attribute-value pairs, the generating including, for each candidate attribute-value pair, determining whether the candidate attribute-value pair has an attribute that is on the expanded whitelist, and if the candidate attribute-value pair does have an attribute that is on the expanded whitelist, including the candidate attribute-value pair in the plurality of valid attribute pairs. Using the expanded attribute whitelist to identify valid attribute-valid pairs can comprise extracting a plurality of candidate attribute-value pairs from a second collection of documents, the candidate attribute-value pairs identified according to a respective structure of the one or more documents; grouping the candidate attribute-value pairs according to both a particular document from which each candidate attribute-value pair was extracted and a corresponding structure of that document; and determining whether a candidate attribute-value pair is in a group with a threshold number of attribute-value pairs that have an attribute on the expanded whitelist, and if so, including the candidate attribute-value pair in the plurality of valid attribute-value pairs. The score can reflect a number of attributes on the initial attribute whitelist that are in a group with the unique attribute.

In general, another aspect of the subject matter described in this specification can be embodied in methods that include the actions of extracting a plurality of candidate attribute-value pairs from a collection of documents, the candidate attribute-value pairs identified according to a respective structure of one or more of the documents; identifying one or more features for each candidate attribute-value pair, at least one of the one or more features determined from tokens in the candidate attribute-value pair; and determining whether each candidate attribute-value pair is a valid attribute-value pair, and filtering out non valid attribute-value pairs from the plurality of candidate attribute-value pairs. Other embodiments of this aspect include corresponding systems, apparatus, and computer programs products recorded on computer storage devices, each configured to perform the operations of the method.

These and other embodiments can each optionally include one or more of the following features. The method can further include grouping the candidate attribute-value pairs according to both a particular document from which each candidate attribute-value pair is extracted and a corresponding structure of that document, and at least one of the one or more features for a first candidate attribute-value pair can be determined from tokens in candidate attribute-value pairs in a same group as the first candidate attribute-value pair. Extracting a plurality of candidate attribute-value pairs according to the structure of each document can include extracting candidate attribute-value pairs from one or more of relational tables, two column tables, or colon delimited pairs. The determining can be performed using a linear classifier. The method can further include training the linear classifier using data extracted from a fact repository.

Particular embodiments of the subject matter described in this specification can be implemented so as to realize one or more of the following advantages. Attribute-value pairs can be automatically extracted from documents. The attribute-value pairs can be associated with the document they are extracted from or with each other, to improve a variety of information retrieval applications. Attribute whitelists can be expanded so that additional attributes are identified in documents. Feature-based filters can identify valid attribute-value pairs that expanded attribute whitelists are not able to identify.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
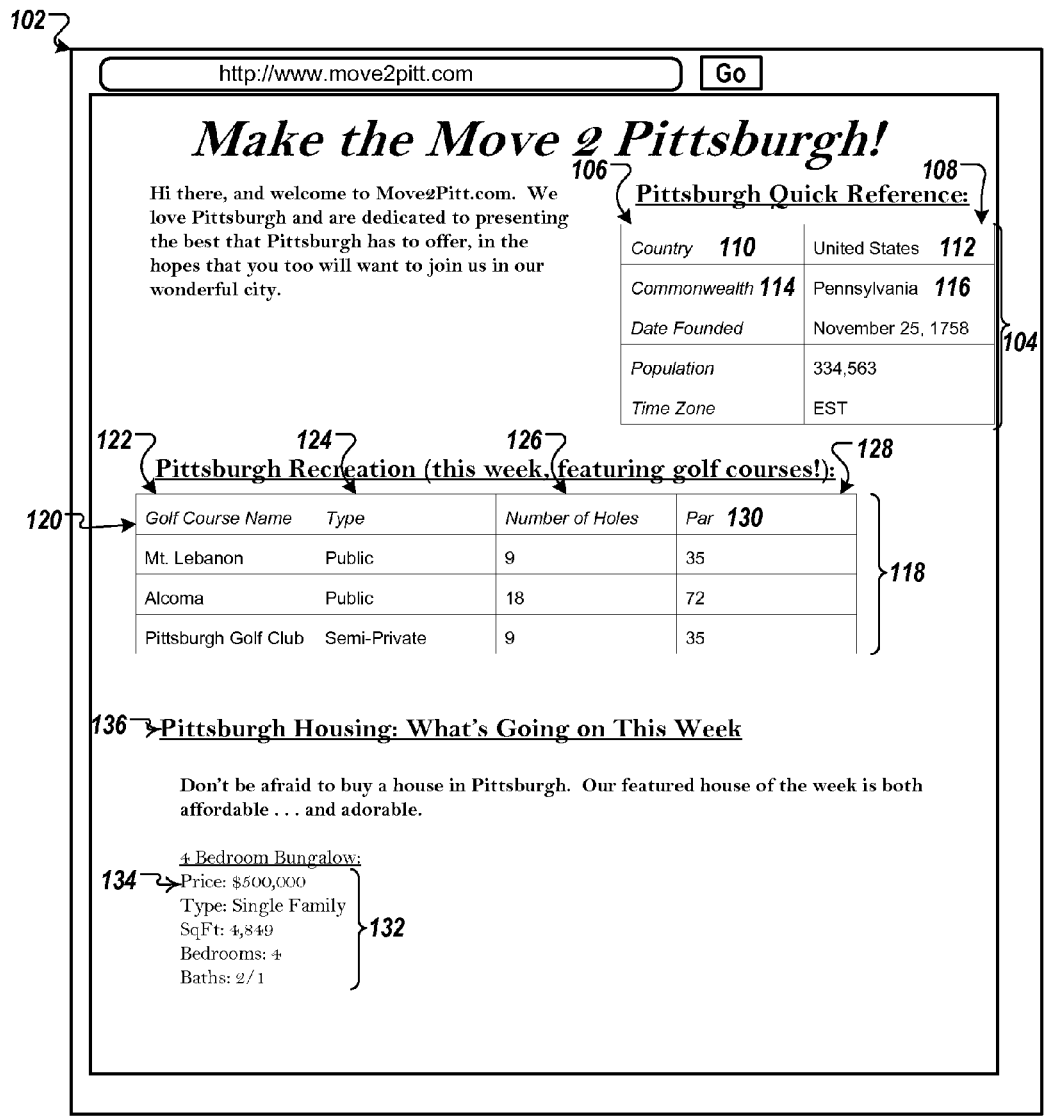
FIG. 1 illustrates an example structured document containing attribute-value pairs.

FIG. 1 illustrates an example structured document 102 containing attribute-value pairs. The structured document 102 can include multiple types of structure at different locations in the document. Attribute-value pairs can appear in various places in a structured document. For example, attribute-value pairs can appear in two-column tables (e.g., two-column table 104) that list the attribute in the left column (e.g., column 106) and the value for the attribute in the right column (e.g., column 108). For example, in table 104, the attribute "country" 110 has a value of "United States" 112 and the attribute "Commonwealth" 114 has a value of "Pennsylvania" 116.

Attribute-value pairs can also appear in relational tables (e.g., relational table 118), where attributes appear in the top row (e.g., row 120) of the table and values appear in the column underneath each row entry (e.g., columns 122, 124, 126, and 128). For example, in table 118, attribute "Par" 130 corresponds to three attribute-value pairs with values of 35, 72, and 35, respectively.

Attribute-value pairs can also appear as colon-delimited pairs (e.g., colon-delimited pairs 132). Each colon-delimited pair follows the pattern "attribute: value." For example, the text "Price: $500,000" 134 corresponds to an attribute-value pair having an attribute of "Price" and a value of "$500,000." Attribute-value pairs can appear in other formats in a document, for example, in tables with many columns, where each non-header column corresponds to a distinct entity, in tab delimited structures, in a table with multiple interspersed header rows, or in a format where the attribute appears on its own line, followed by a list (e.g., a bulleted list) of values for the attribute.

Many attribute-value pairs can be identified from the structure of a document, e.g., by identifying two-column tables, relational tables, colon-delimited pairs, and other relevant document structure. However, structure alone is not always an indication that data is an attribute-value pair. For example, some tables can be interpreted in multiple ways, only one of which leads to the identification of valid attribute-value pairs. For example, table 104 is a two-column table, but it could also be interpreted as a relational table, where Country 110 and United States 112 are attributes, and the rest of columns 106 and 108 are values. However, candidate pairs such as (Country, Commonwealth), corresponding to cells 110 and 114, or (United States, Pennsylvania), corresponding to cells 112 and 116, are not valid attribute-value pairs. As another example, the structure used to identify candidate attribute-value pairs can be used in completely different contexts. For example, the phrase "Pittsburgh Housing: What's Going on This Week" 136 appears in the document 102. The phrase is a colon-delimited pair, and thus (Pittsburgh Housing, What's Going on This Week) is a candidate attribute-value pair according to the structure of the document. However, (Pittsburgh Housing, What's Going on This Week) is not a valid attribute-value pair, because Pittsburgh Housing is not an attribute. Therefore, once candidate attribute-value pairs are identified from a document, they need to be filtered to remove any erroneous candidate attribute-value pairs.

Once valid attribute-value pairs are identified, an information retrieval system can use the pairs in various ways to enhance a user's search experience, for example, by presenting the attribute-value pairs instead of, or in addition to, search results responsive to a user's query. In some implementations, the extracted attribute-value pairs are matched with a corresponding entity using named-entity recognition techniques, resulting in entity-attribute-value triples. An information retrieval system can use these entity-attribute-value triples to identify resources (or information extracted from resources) responsive to queries such as "cities in Pennsylvania founded before 1800" or "cities with populations greater than 300,000" by selecting entities having an attribute and value matching the query. The entity-attribute-value triples can also be used to build a knowledge repository.

Figure 2:
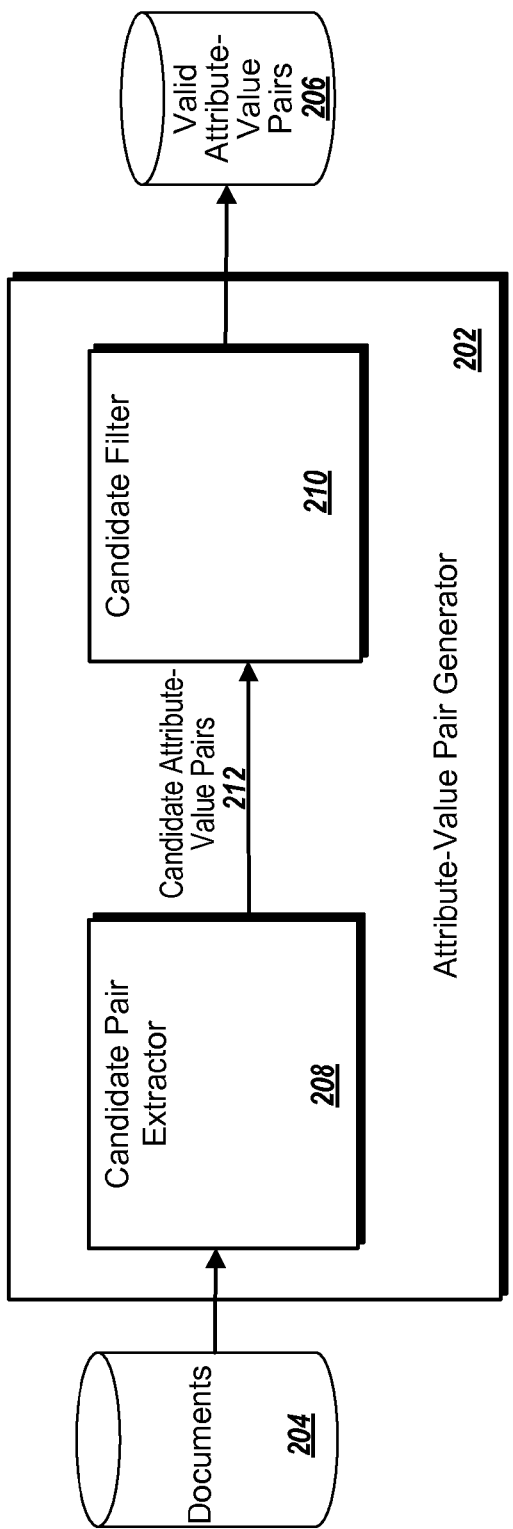
FIG. 2 illustrates an example attribute-value pair generator that processes a collection of documents and returns valid attribute-value pairs.

FIG. 2 illustrates an example attribute-value pair generator 202 that processes a collection of documents 204 and returns valid attribute-value pairs 206. At least some of the documents in the collection of documents 204 are structured documents. The structured documents can share the same structure or have a different structure.

The attribute-value pair generator 202 includes a candidate pair extractor 208 and a candidate filter 210. The boxes shown in FIG. 2 logically represent executing software components or modules. These components can be combined or subdivided in ways other than those shown in FIG. 2 and can be distributed on two or more computing devices.

The candidate pair extractor 208 receives documents and processes them to extract candidate attribute-value pairs 212 according to the types of structures of the documents. In some implementations, the candidate pair extractor 208 examines the structure of each document to identify tables (for example, by identifying locations of the table tag in HTML documents). The candidate pair extractor 208 then parses the text and the structure of the table to identify whether the table is likely to have attribute-value pairs and therefore should be processed further. For example, the candidate pair extractor 208 can determine whether a table is used for formatting (e.g., is a HTML table that contains form elements such as text boxes, or is a table that contains nested tables), and then ignore tables used for formatting.

The candidate pair extractor 208 can also ignore rows in tables that span across multiple columns or contain other tables, as these are generally rows used for formatting and not to present attribute-value pairs. In some implementations, the candidate pair extractor 208 ignores tables that it determines have at least a threshold number of rows that are used for formatting. The candidate pair extractor 208 processes any remaining tables in the document being processed to extract candidate attribute-value pairs. When the candidate pair extractor 208 is searching for two-column tables, it uses only tables having two columns and extracts the attribute from the left column and the value from the right column. When the candidate pair extractor 208 is looking for relational tables, it extracts the attribute from the top row of the table, and the values from the column underneath each attribute.

In some implementations, the candidate pair extractor 208 extracts attribute-value pairs from a document according to the structure of the document by extracting attribute-value pairs from colon-delimited pairs instead of, or in addition to, tables. The candidate pair extractor 208 identifies colon-delimited pairs using regular expression matching, for example, by parsing the text of the document to identify phrases matching the "attribute: value" pattern. In some implementations, the candidate pair extractor 208 further filters the pairs matched during regular expression matching so that only pairs meant to appear on a single line, or only pairs meant to appear on a line with no other pairs, are extracted. The candidate pair extractor 208 can determine where the pairs are meant to appear from the structure of the document.

For example, the candidate pair extractor 208 can segment the document into individual lines of text, and extract attribute-value pairs from each line that contains one (and only one) colon. The candidate pair extractor 208 segments the document into individual lines of text by segmenting the document where the structure indicates a line break is intended. For example, in an HTML document, the candidate pair extractor can segment the document at each line breaking HTML tag (e.g., the tags SPAN, DIV, P, LI, DT, TD, TH, and BR).

In some implementations, the candidate pair extractor 208 groups the candidate attribute-value pairs according to the particular document from which they are extracted and a corresponding structure of that document. For example, the candidate pair extractor 208 can group candidate attribute-value pairs according to the specific table (or list of colon-delimited pairs) from which they were extracted. The candidate pair extractor 208 identifies lists of colon-delimited pairs, for example, when colon-delimited pairs are not separated by intervening spaces or text. For example, with reference to the document 102 shown in FIG. 1, the candidate pair extractor 208 would group attribute-value pairs from the table 104 into one group, group attribute-value pairs from the table 118 into another group, and group attribute-value pairs from the list 132 into yet another group. The candidate pair extractor 208 identifies the list 132 as a list of candidate attribute-value pairs, rather than individual candidate attribute-value pairs because each pair follows the other without intervening space or text.

In some implementations, the candidate pair extractor 208 interprets the same table as having multiple kinds of structure. For example, a table with two columns can be either a two-column table or a relational table. In these implementations, the candidate pair extractor 208 groups the attribute-value pairs according to the particular document, the particular table, and the particular interpretation of the table under which the pairs were extracted.

The candidate filter 210 receives candidate attribute-value pairs 212 and filters out invalid attribute-value pairs, resulting in a set of valid attribute-value pairs 206. The candidate filter can apply various algorithms to filter the attribute-value pairs including using, for example, an attribute whitelist and feature-based candidate filtering, as described below.

Figure 3:
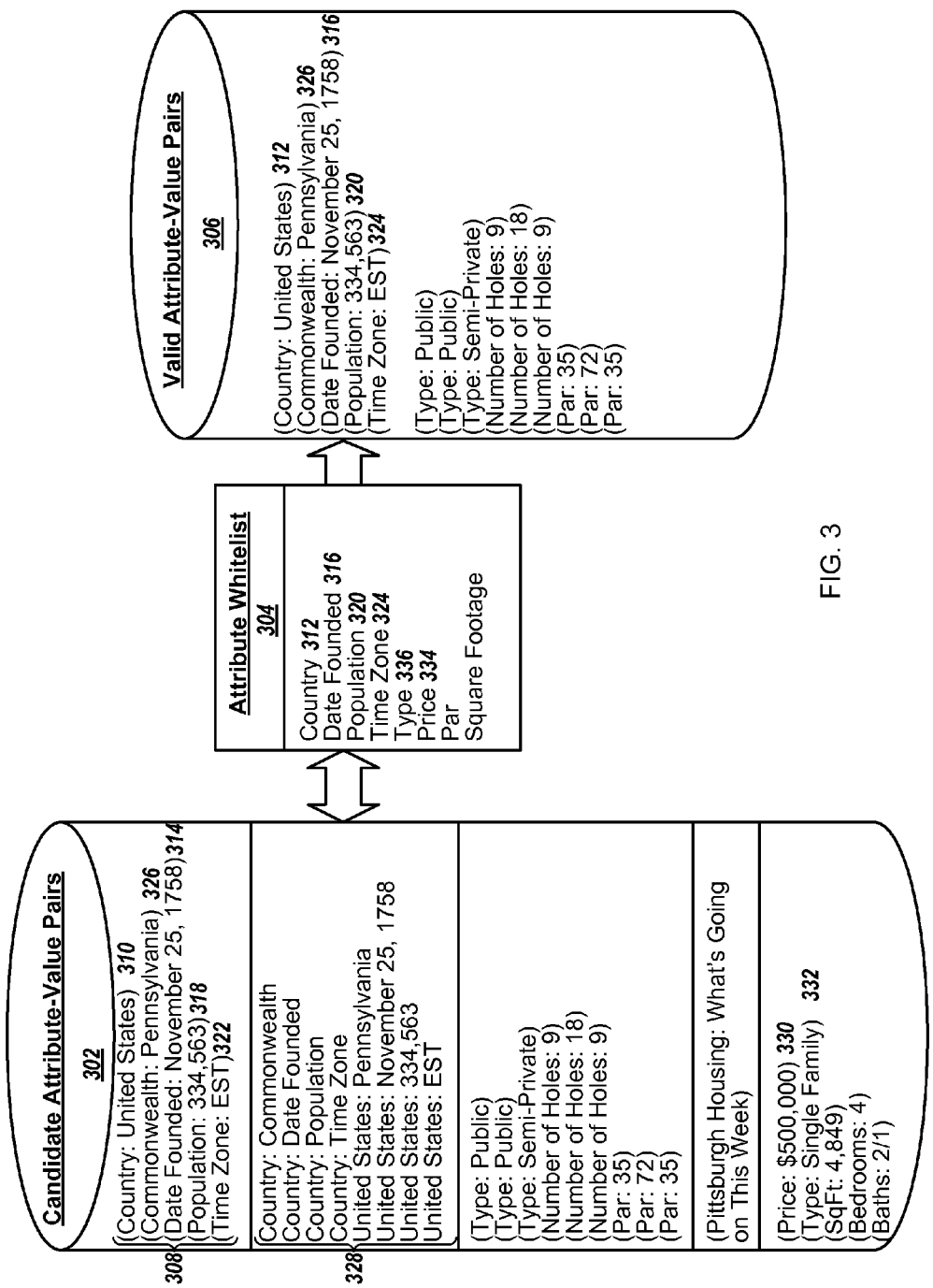
FIG. 3 illustrates an example of filtering candidate attribute-value pairs extracted from the document shown in FIG. 1 using an attribute whitelist.

FIG. 3 illustrates an example of filtering candidate attribute-value pairs 302 extracted from the document 102 shown in FIG. 1 using an attribute whitelist 304. The attribute-value pairs shown in FIG. 3 are exemplary, and do not include all possible candidate attribute-value pairs that could be extracted from the document 102. The candidate attribute-value pairs 302 can be generated, for example, using the candidate pair extractor 208. In general, the attribute whitelist is a list of terms or phrases that are used as attributes for entities. The attribute whitelist 304 can be obtained from a suitable ontology, knowledge base (e.g., Freebase), or fact repository that stores attributes of entities. In some implementations, the whitelist is obtained from a domain fact repository extracted by a data mining tool such as Grazer that begins with a set of initial facts scraped from a knowledge repository such as Wikipedia™, finds one or more of the initial facts in other documents, learns the underlying structure of the documents, and extracts additional facts from the other documents. Additional information regarding Grazer can be found in S. Zhao and J. Betz, *Corroborate and Learn Facts from the Web*, Proceedings of the 13$^{th}$ ACM SIGKDD International Conference on Knowledge Discovery and Data Mining, August 2007, at 995-1003.

In some implementations, a candidate filter (e.g., the candidate filter 210 of FIG. 2) filters the candidate attribute-value pairs based on groups identified by the candidate pair extractor. The candidate filter compares the attribute of each attribute-value pair in a group to the attribute whitelist 304. If the group contains a threshold number of attribute-value pairs whose attributes are on the whitelist (e.g., 60%, 66%, 75%, etc. of the candidate attribute-value pairs in the group), all attribute-value pairs in the group are included in the group of valid attribute-value pairs.

For example, candidate attribute-value pairs 308 are in a group because they all appear in the same table 104 in FIG. 1 and were extracted according to the same interpretation of the table. Four out of the five candidate attribute-value pairs in the group 308 have attributes on the attribute white list (i.e., (Country: United States) 310 corresponding to "Country" 312, (Date Founded: Nov. 25, 1758) 314 corresponding to "Date Founded" 316, (Population: 334,563) 318 corresponding to "Population" 320, and (Time Zone: EST) 322 corresponding to "Time Zone" 324). Even though "Commonwealth" does not appear on the attribute whitelist, the candidate filter still includes (Commonwealth: Pennsylvania) 326 in the set of valid attribute-value pairs because more than a threshold number of the candidate attribute-value pairs in the group 314 with (Commonwealth: Pennsylvania) 326 have attributes on the whitelist. In contrast, group 328, which includes candidate attribute pairs extracted from the same table as the group 308, but under a different interpretation of the table, includes only one attribute ("Country" 312) that appears on the attribute whitelist 304. Four of the eight attribute-value pairs in the group 328 correspond to the attribute "Country" 312 This is below the threshold, and therefore, none of the group members are included in the group of valid attribute-value pairs 306.

In other implementations, the candidate filter alternatively, or additionally, includes any attribute-value pairs whose attribute appears on the attribute whitelist 304 in the group of valid attribute-value pairs 306. For example, in this implementation, attribute-value pairs such as (Price: $500,000) 330 and (Type: Single Family) 332 would appear in the group of attribute-value pairs because their attributes "Price" 334 and "Type" 336 appear on the attribute whitelist 304.

In some implementations, the candidate filter treats attribute-value pairs having an attribute that partially matches an attribute on the attribute whitelist 304 as having an attribute that matches an attribute on the attribute whitelist 304. For example, the candidate filter can identify partial matches between two attributes when the attributes have a threshold number of letters (e.g., the first four letters, or two-thirds of the letters), when one attribute is an abbreviation for the other (e.g., "SqFt" for "Square Feet"), or when one attribute is a misspelled version of the other. Other standard algorithms for determining similarity between the text of the attributes can be used, for example, edit distance or longest common subsequence.

Figure 4:
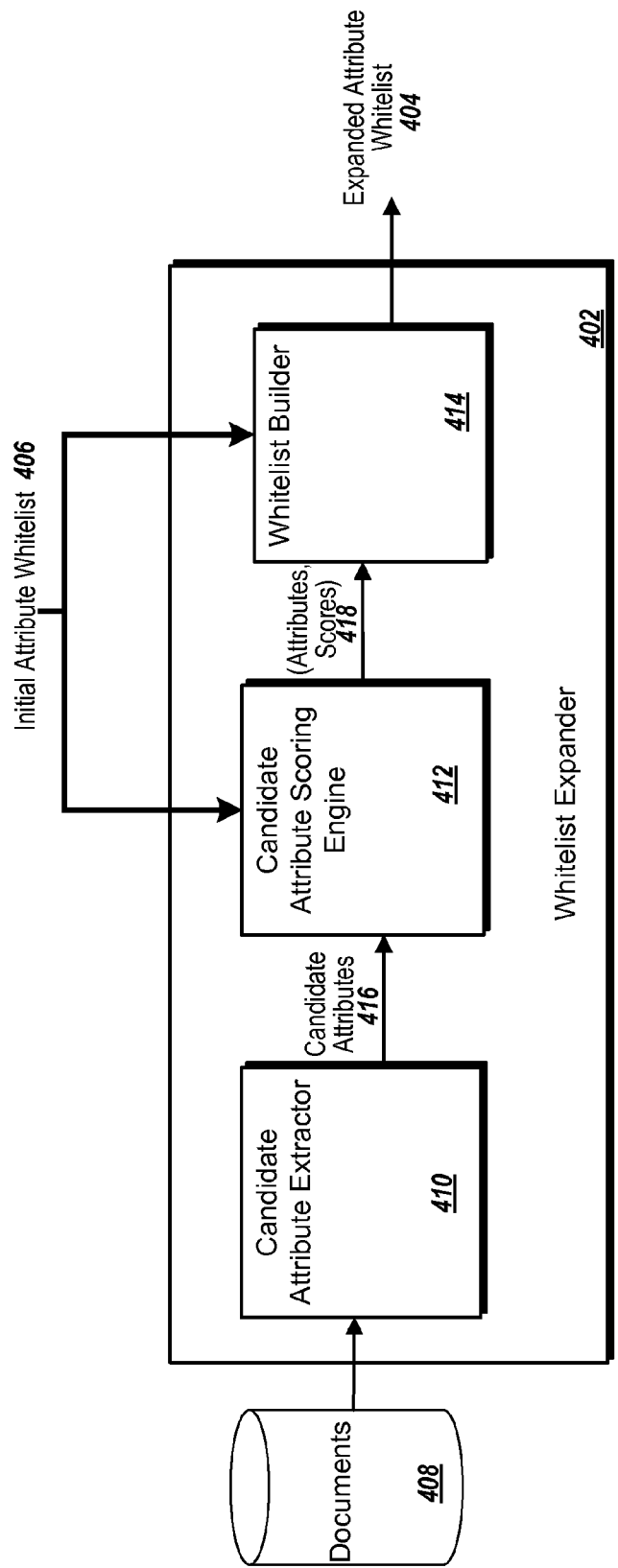
FIG. 4 illustrates an example whitelist expander that generates an expanded attribute whitelist from an initial attribute whitelist using a collection of documents.

FIG. 4 illustrates an example whitelist expander 402 that generates an expanded attribute whitelist 404 from an initial attribute whitelist 406 using a collection of documents 408. The expanded attribute whitelist 404 can then be used by the candidate filter in place of the attribute whitelist 304 when doing whitelist-based filtering, as described above with reference to FIG. 3.

The whitelist expander 402 includes a candidate attribute extractor 410, a candidate attribute scoring engine 412, and a whitelist builder 414. The boxes shown in FIG. 4 logically represent executing software components or modules. These components can be combined or subdivided in ways other than those shown in FIG. 4 and can be distributed on two or more computing devices.

The candidate attribute extractor 410 extracts candidate attributes 416 from the documents 408. The candidate attribute extractor 410 groups the candidate attributes much as the candidate pair extractor groups the extracted pairs (i.e., according to both the particular document from which each candidate attribute is extracted and a corresponding structure of the document). In some implementations, the candidate attribute extractor 410 extracts the candidate attributes by receiving a group of candidate attribute-value pairs extracted by the candidate pair extractor and extracting an attribute from each pair. In some other implementations, the candidate attribute extractor 410 processes the documents much as the candidate pair extractor processes the documents, but extracts only the attribute from each identified candidate attribute-value pair, instead of extracting the entire pair.

The candidate attribute scoring engine 412 receives the candidate attributes 416 and the initial attribute whitelist 406 and calculates a score for each unique attribute in the group of candidate attributes. The score reflects the number of times the candidate attribute appears in the same group as a known attribute on the initial attribute whitelist 406.

In some implementations, the score f(a) for an attribute a is calculated according to the following formula:

$$f(a) = \sum_{g \in G} n(a, g) \times n'(A, a, g),$$

where G is the set of all of the groups of candidate attributes extracted from the collection of documents, A is the initial attribute whitelist 406, n(a, g) is the number of times the attribute a appears in the group g (usually 1 or 0), and n' (A, a, g) is the number of times any attribute in A (except a) appears in group g. Other scores and modifications to the score are possible.

The whitelist builder 414 receives the attribute whitelist 406 and the candidate attributes and their corresponding scores 418 and generates the expanded attribute whitelist 404. The whitelist builder 414 adds the attributes on the initial attribute whitelist 406 to the expanded attribute whitelist 404, considers each candidate attribute in turn, and adds each candidate attribute whose score satisfies (e.g., exceeds) a threshold to the expanded attribute whitelist 404. The threshold can be determined empirically. For example, in some implementations, whitelist expansion is performed using a set of development documents. Various thresholds are tried, and the threshold that yields an output closest to the output received from hand-labeling the attribute-value pairs (e.g., by a human operator) is selected.

Figure 5:
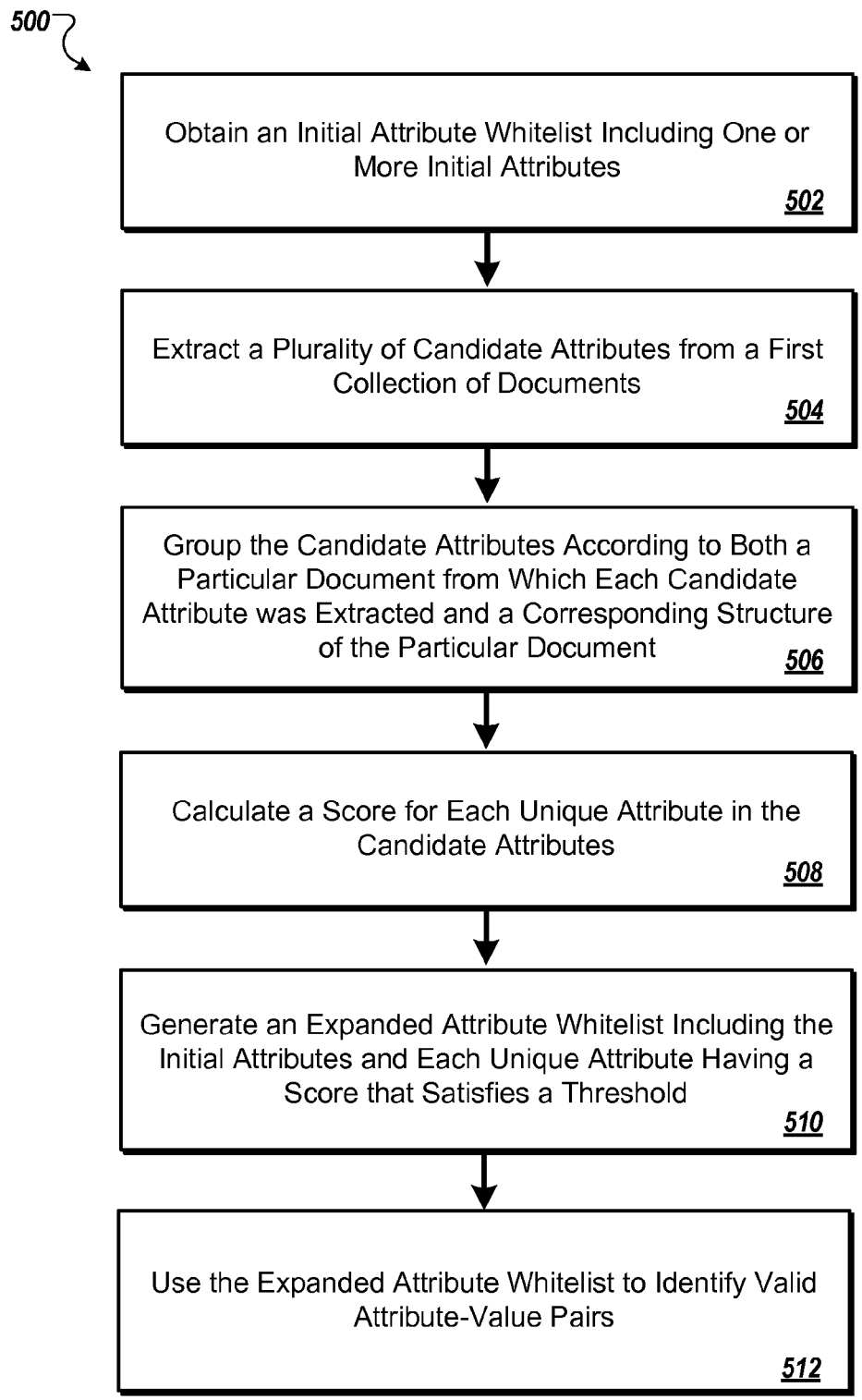
FIG. 5 illustrates an example method for expanding an initial attribute whitelist and using the expanded whitelist to identify valid attribute-value pairs.

FIG. 5 illustrates an example method 500 for expanding an initial attribute whitelist and using the expanded whitelist to identify valid attribute-value pairs. For convenience, the example method 500 will be described in reference to a system that performs the method 500. The system can be, for example, the attribute-value pair generator 202 or the attribute-value pair generator 202 and a separate whitelist expander 402.

The system obtains 502 an initial attribute whitelist including one or more initial attributes. The initial attribute whitelist can be obtained, for example, as described above with reference to FIG. 3.

The system extracts 504 a plurality of candidate attributes from a first collection of documents, for example, as described above with reference to FIG. 4.

The system groups 506 the candidate attributes according to both a particular document from which each candidate attribute was extracted and a corresponding structure of the particular document, for example, as described above with reference to FIGS. 2 and 4.

The system calculates 508 a score for each unique attribute in the candidate attributes, for example, as described above with reference to FIG. 4. The score reflects the number of groups containing the unique attribute and an attribute on the initial attribute whitelist, and in some implementations, further reflects the number of attributes on the initial attribute whitelist that are in each group with the unique attribute, for example, as described above with reference to FIG. 4.

The system generates 510 an expanded attribute whitelist including the initial attributes and each unique attribute that has a score that satisfies a threshold, for example, as described above with reference to FIG. 4.

The system uses 512 the expanded attribute whitelist to identify valid attribute-value pairs. In general, the system compares candidate attribute-value pairs to attributes on the expanded whitelist to determine whether each candidate attribute-value pair is valid. In some implementations, the system extracts candidate attribute-value pairs from a collection of documents (for example, as described above with reference to FIG. 2), and identifies candidate attribute-value pairs as valid when their attributes appear on the expanded whitelist. In some implementations, the system groups the extracted attribute-value pairs according to both a particular document from which each candidate document was extracted and a corresponding structure of that document (for example, as described above with reference to FIG. 2). The system then identifies a given attribute-value pair as valid when the number of attribute-value pairs in a group with the given attribute-value pair satisfies a threshold number of pairs (for example, as described above with reference to FIG. 3).

Figure 6:
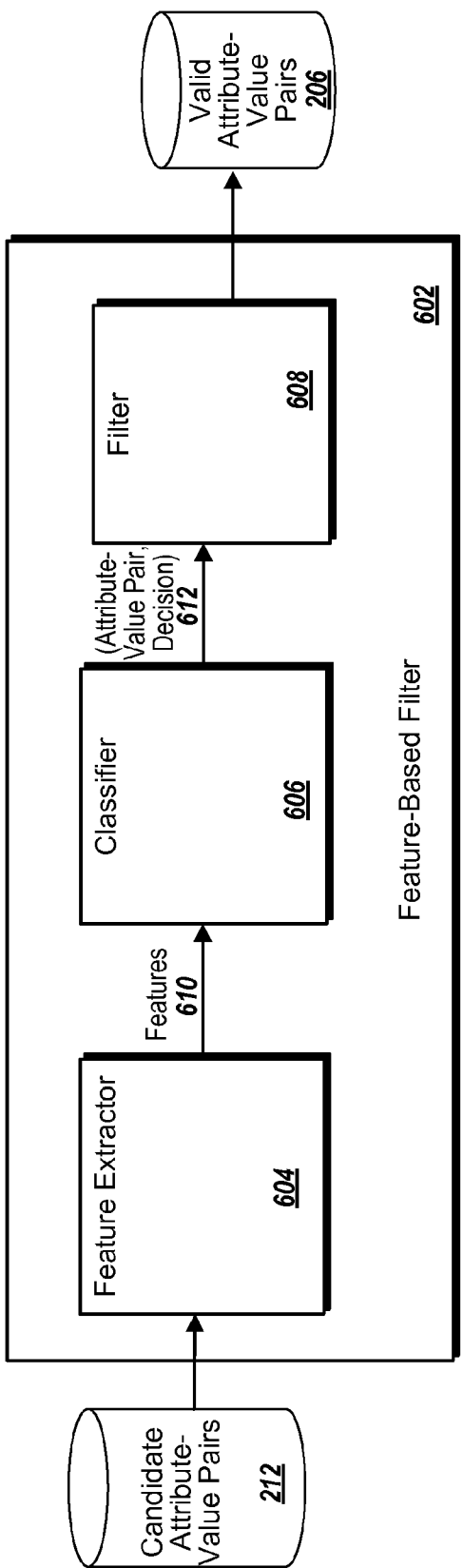
FIG. 6 illustrates an example feature-based filter.

FIG. 6 illustrates a feature-based filter 602. The feature-based filter 602 can be used as the candidate filter (e.g., candidate filter 210 of FIG. 2) instead of, or in addition to, a whitelist-based filter. The feature based filter receives candidate attribute-value pairs 212 and processes them to identify a group of valid attribute-value pairs 206.

The feature based filter 602 includes a feature extractor 604, a classifier 606, and a filter 608. The boxes shown in FIG. 6 logically represent executing software components or modules. These components can be combined or subdivided in ways other than those shown in FIG. 6 and can be distributed on two or more computing devices.

The feature extractor 604 processes each candidate attribute-value pair and extracts one or more features 610 for each pair, represented, for example, as a vector of feature scores. The features for a given candidate attribute-value pair can be determined from tokens in the given candidate attribute-value pair (e.g., bag-of-words features and case signatures) or tokens in candidate attribute-value pairs in the same group as the given candidate attribute-value pair. Each token is an atomic unit of text in the attribute-value pair (e.g., a word).

The feature extractor 604 can determine various features from tokens in the given candidate attribute-value pair, including one or more of: how often a given token appears in the attribute, whether a given token is the first token of the attribute, whether a given token is the last token of the attribute, the frequency with which the tokens in the attribute have a given case signature (where the case signature of a token is the concatenation of its character types—e.g., letters, digits—with repeated types conflated into a single instance), whether the first token in the attribute has a given case signature, whether the last token of the attribute has a given case signature, whether the attribute contains a certain number of tokens, how often a given token appears in the value, whether a given token is the first token of the value, whether a given token is the last token of the value, the frequency with which the tokens of the value have a given case signature, whether the first token in the value has a given case signature, and whether the last token in the value has a given case signature. Other features are also possible, for example, whether the last token of the attribute is an out-of-vocabulary word (e.g., a word that was not observed in the documents used to train the classifier).

The feature extractor 604 can also determine various features from tokens in candidate attribute-value pairs in the same group as the given candidate attribute-value pair, for example, how often a given token is the first token of any other attribute in the same group, or how often a token is the last token of any other attribute in the same group. For example, attribute-value pairs in groups that include an attribute whose last token is "date" are more likely to be valid attribute-value pairs.

In some implementations, the feature extractor 604 further generates features using feature conjunctions of attribute and value related features by multiplying the values of the two features. For example, if feature x has a score of 2 and feature y has a score of 3, the feature conjunction score for x and y is 2×3=6. The feature conjunctions are a useful representation of the attribute-value pair as a whole and allow the classifier 606 to consider correspondence between individual attributes and values. For example, feature conjunctions can include whether when the attribute ends in the word "number," the value is a number (e.g., "phone number: 1234567"), whether when the attribute ends in the word "name," the value begins with a capitalized word (e.g., "first name: John"), whether both the last token of the attribute and the first token of the value are numbers (e.g., "10:30"), or whether when the last token of the attribute is a capitalized word, the first token of the value is the word "the" (e.g., "Pittsburgh: The World's Most Happening Place").

The classifier 606 receives the features 610 for each candidate attribute-value pair and processes them to determine whether the candidate attribute-value pair should be a valid attribute-value pair. In some implementations, a modified form of the classifier can be used. The modified classifier is structured so that it considers both the features of the candidate attribute-value pair, and whether the other attributes in the same group as the candidate attribute-value pair are valid attribute-value pairs. This requires the use of additional infrastructure, for example, an extra hidden variable for each candidate attribute-value pair that influences the individual filtering decisions for other candidate attribute-value pairs in the group. In some implementations, the modified classifier further considers variables for overlapping groups, so that only one group is considered valid.

In various implementations, the classifier 606 is a binary classifier learned using a set of training examples (e.g., candidate attribute-value pairs coupled with a designation of "valid" or "invalid"). In some implementations, the classifier is trained using an online passive-aggressive algorithm with a linear kernel. The algorithm can optionally use a soft-margin version of the passive-aggressive update with a low aggressiveness parameter. Additional information regarding the online passive-aggressive algorithm can be found in K. Crammer, O. Dekel, J. Keshet, S. Shalev-Shwartz, and Y. Singer, *Online Passive-Aggressive Algorithm*, Journal of Machine Learning Research, 2006, at 7:551-585. However, any standard machine learning techniques can be used, including, for example, a neural network, a support vector machine, or a linear regression.

The classifier is trained (e.g., by a training system) by collecting a training set of example valid attribute-value pairs and invalid attribute-value pairs, extracting features from each pair, and providing the features and an identification of whether the pair is valid or invalid to the algorithm training the classifier. In some implementations, the system collects the training set using a fact repository, such as the Grazer fact repository described above with reference to FIG. 3. The fact repository includes facts and a reference to at least one source document for each fact. The system identifies the documents that are sources for facts, collects the candidate attribute-value pairs from the document (for example, as described above with reference to FIG. 2), labels the pairs as valid if they match a known fact, and otherwise labels them as invalid.

In some implementations, the system further adjusts the training examples to address situations where the fact repository is sparse and therefore, there may not be an exact match for most of the facts in the source document. For example, when the repository is sparse, normalization and changes in page content can lead to false negatives. To address this problem, the system can identify partial matches as valid attribute-value pairs. A partial match occurs when a given number of characters in the attribute or value (e.g., the first four characters) match the fact the pair is being compared to. For example, an attribute of "birthday" would be a partial match for a fact of "birth date." In some implementations, a partial match on both the attribute and the value counts as a match. In other implementations, one of either the attribute or the value must match the fact exactly. The system can also address the problem by identifying all attribute-value pairs in a group with one valid attribute-value pair as valid attribute-value pairs, or by using an attribute whitelist (e.g., as described above with reference to FIG. 3) to identify additional valid attribute-value pairs. The system can reduce the false negatives even further by removing invalid attribute-value pairs from the training data when they have similar feature-vector representations to valid attribute-value pairs. For example, the system can calculate a similarity score s(x) for all attribute-value pairs x as follows:

$$s(x) = \frac{1}{|P(x)|} \sum_{x' \in P(x)} sim(x', x),$$

where P(x) is the set of valid attribute-value pairs with non-zero cosine similarity with x, and sim(x', x) is the cosine similarity between x' and x. The cosine similarity sim(x', x) is calculated by determining the distance between the feature vectors for the attribute-value pairs. For example, if a search result x has a feature vector of X=($x_1$, $x_2$, $x_3$) and a search result x' has a feature vector of Y=($y_1$, $y_2$, $y_3$), sim(x, x') is calculated as follows:

$$sim(x, x') = \text{cosine similarity} = \frac{X \bullet Y}{\|X\| \cdot \|Y\|} = \frac{x_1 \cdot y_1 + x_2 \cdot y_2 + x_3 \cdot y_3}{\sqrt{x_1^2 + x_2^2 + x_3^2} \cdot \sqrt{y_1^2 + y_2^2 + y_3^2}}.$$

In some implementations the cosine similarity is weighted, e.g., by weighting each feature by the inverse document frequency of the feature (e.g., in the documents from which the attribute-value pairs are extracted, or another corpus of documents). The inverse document frequency of a feature can be calculated, for example, by dividing the total number of documents by the number of documents that contain the feature, and then taking the logarithm of the quotient. Other similarity scores can also be used, for example, Jaccard similarity.

Once the similarity scores sim(x) are calculated, the system then removes all invalid attribute-value pairs x with similarity scores that satisfy (e.g., are below) a given threshold. The threshold can be determined, for example, empirically (e.g., by hand-labeling a development set, experimenting with different thresholds, and selecting the threshold that yields output most closely resembling the hand-labels.).

In some implementations, the system further removes some features from consideration by the classifier, for example, when the features occur less than a threshold number of times (e.g., 200 times) in the training set. In some implementations, the threshold is different when a feature conjoins two features (e.g., each feature included in the conjoined feature must appear 1000 times).

The filter 608 receives data 612 identifying the attribute-value pair and the decision for the attribute-value pair from the classifier 606 and generates the group of valid attribute-value pairs 206 by filtering out the candidate pairs that the classifier indicated should not be valid attribute-value pairs.

Figure 7:
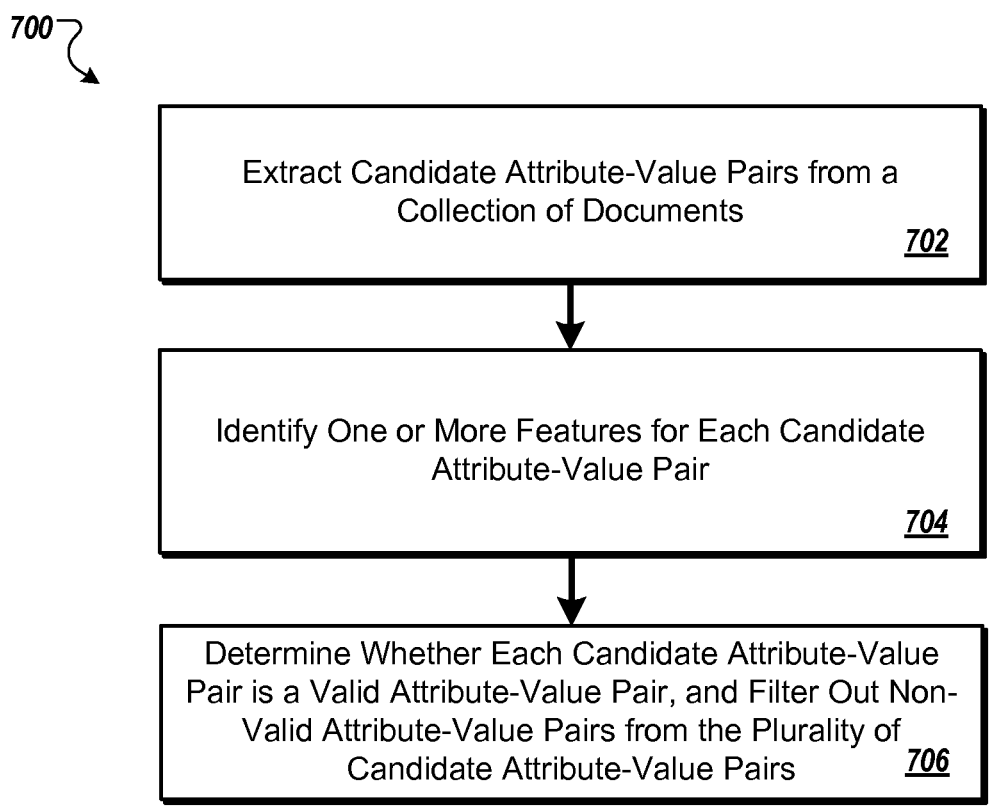
FIG. 7 illustrates an example method for identifying valid attribute-value pairs using feature-based filtering.

FIG. 7 illustrates an example method 700 for identifying valid attribute-value pairs using feature-based filtering. For convenience, the example method 700 will be described in reference to a system that performs the method 700. The system can include, for example, the attribute-value pair generator 202.

The system extracts 702 candidate attribute-value pairs from a collection of documents. The candidate attribute-value pairs are identified according to various types of document structure, for example, as described above with reference to FIG. 2. In some implementations, the candidate attribute-value pairs are grouped according to a particular document from which each candidate attribute was extracted and a corresponding structure of that document.

The system identifies 704 one or more features for each candidate attribute-value pair, for example, as described above with reference to FIG. 4. The features can be based on the tokens in the candidate attribute-value pair being processed or on tokens in other candidate attribute-value pairs in the same group as the attribute-value pair being processed.

The system determines 706 whether each candidate attribute-value pair is a valid attribute-value pair and filters out non-valid attribute-value pairs from the plurality of candidate attribute-value pairs, for example, as described above with reference to FIG. 6. In some implementations, the determining is performed using a linear classifier, for example, as described above with reference to FIG. 6.

Figure 8:
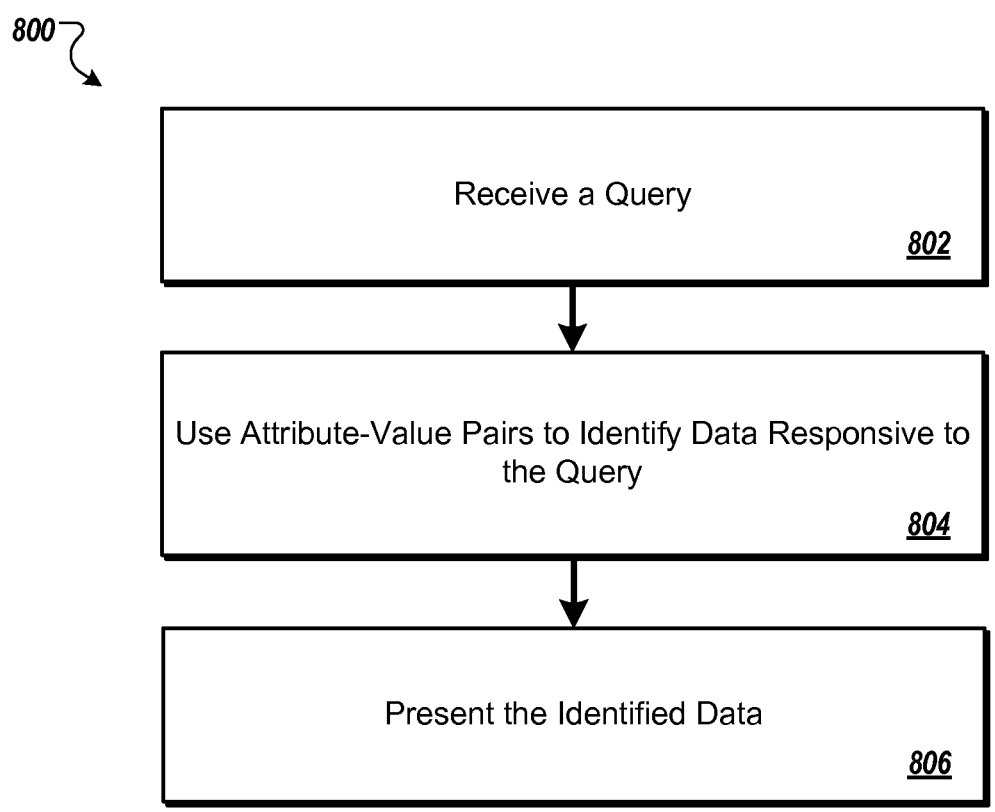
FIG. 8 illustrates an example method 800 for using attribute-value pairs to identify data responsive to a query.

FIG. 8 illustrates an example method 800 for using attribute-value pairs to identify data responsive to a query. For convenience, the example method 800 will be described in reference to a system that performs the method 800. The system can be, for example, an information retrieval system.

The system receives 802 a query. The system can receive the query, for example, from a user, or a computer or computer process. The query is a request for information or resources relevant to a topic.

The system uses 804 attribute-value pairs to identify data responsive to the query. The data can be individual pieces of information (e.g., identifications of entities responsive to the query) or can be resources, such as documents, responsive to the query.

In some implementations, the system searches a knowledge base built from attribute-value pairs to identify information responsive to the query. In other implementations, the system identifies resources that include attribute-value pairs responsive to the query. For example, if a query for "cities with populations under 300,000" is received, the system can identify a document from which an attribute-value pair satisfying the query (e.g., "(population, 500,000)") was extracted. In some implementations, the system further associates attribute-value pairs with entities and uses the entity-attribute-value triples to identify the data.

The system presents 806 the data in response to the query. For example, the system can present the data in a search results user interface or other interface.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining an initial attribute whitelist, the initial attribute whitelist including one or more initial attributes;

processing a first collection of documents, wherein each of the documents has content to be displayed and an underlying structure that defines how the content is to be displayed, to identify a plurality of pairings of candidate attributes with candidate values in the documents, wherein each candidate attribute and each candidate value is content found in the content to be displayed;

grouping the candidate attributes into a plurality of groups according to both a particular document in the first collection in which each candidate attribute was identified and the underlying structure in the particular document in the first collection in which each candidate attribute was identified;

calculating a score for each unique attribute in the candidate attributes, where the score reflects a number of groups containing both the unique attribute and an attribute on the initial attribute whitelist;

generating an expanded attribute whitelist, the expanded attribute whitelist including the initial attributes and each unique attribute having a respective score that satisfies a threshold; and using the expanded attribute whitelist to identify valid pairings of candidate attributes with candidate values.

2. The method of claim 1, where using the expanded attribute whitelist to identify valid pairings of candidate attributes with candidate values comprises:

identifying a plurality of pairings of candidate attributes with candidate values from a second collection of structured documents, the pairings of candidate attributes with candidate values identified according to a respective structure of one or more of the documents in the second collection; and generating a plurality of valid pairings of candidate attributes with candidate values, the generating including, for each pairing of a candidate attribute with a candidate value, determining whether the respective candidate attribute is on the expanded attribute whitelist, and if the candidate attribute is on the expanded attribute whitelist, including the pairing of the candidate attribute with the candidate value in the plurality of valid pairings of candidate attributes with candidate values.

3. The method of claim 1, where using the expanded attribute whitelist to identify valid pairings of candidate attributes with candidate values comprises:

identifying a plurality of pairings of candidate attributes with candidate values from a second collection of documents, the pairings of candidate attributes with candidate values identified according to a respective structure of one or more of the documents in the second collection;

grouping the pairings of candidate attributes with candidate values according to both a particular document in the second collection in which each pairing of candidate attributes with candidate values was identified and the underlying structure in the particular document in the second collection; and determining whether a particular pairing of a candidate attribute with a candidate value identified in the documents of the second collection of documents is in a group with a threshold number of pairings of candidate attributes with candidate values that have an attribute on the expanded attribute whitelist, and if so, including the particular pairing of a candidate attribute with a candidate value in the plurality of valid pairings of candidate attributes with candidate values.

4. The method of claim 1, where the score further reflects a number of attributes on the initial attribute whitelist that are in a group with the unique attribute.

5. The method of claim 1, wherein using the expanded attribute whitelist to identify valid pairings of candidate attributes with candidate values includes comparing a plurality of candidate pairings of candidate attributes with candidate values to attributes on the expanded attribute whitelist.

6. A computer storage device having a computer program stored thereon, the computer program comprising instructions that when executed cause one or more computers to perform actions comprising:

obtaining an initial attribute whitelist, the initial attribute whitelist including one or more initial attributes;

processing a first collection of documents, wherein each of the documents has content to be displayed and an underlying structure that defines how the content is to be displayed, to identify a plurality of pairings of candidate attributes with candidate values in the documents, wherein each candidate attribute and each candidate value is content found in the content to be displayed;

grouping the candidate attributes into a plurality of groups according to both a particular document in the first collection in which each candidate attribute was identified and the underlying structure in the particular document in the first collection in which each candidate attribute was identified;

calculating a score for each unique attribute in the candidate attributes, where the score reflects a number of groups containing both the unique attribute and an attribute on the initial attribute whitelist;

generating an expanded attribute whitelist, the expanded attribute whitelist including the initial attributes and each unique attribute having a respective score that satisfies a threshold; and using the expanded attribute whitelist to identify valid pairings of candidate attributes with candidate values.

7. The computer storage device of claim 6, where using the expanded attribute whitelist to identify valid pairings of candidate attributes with candidate values comprises:

identifying a plurality of pairings of candidate attributes with candidate values from a second collection of documents, the pairings of candidate attributes with candidate values identified according to a respective structure of one or more of the documents in the second collection; and generating a plurality of valid pairings of candidate attributes with candidate values, the generating including, for each pairing of a candidate attribute with a candidate value, determining whether the respective candidate attribute is on the expanded attribute whitelist, and if the candidate attribute value pair does have an attribute is on the expanded whitelist, including the pairing of the candidate attribute with the candidate value in the plurality of valid pairings of candidate attributes with candidate values.

8. The computer storage device of claim 6, where using the expanded attribute whitelist to identify valid pairings of candidate attributes with candidate values comprises:

identifying a plurality of pairings of candidate attributes with candidate values from a second collection of documents, the pairings of candidate attributes with candidate values identified according to a respective structure of one or more of the documents in the second collection;

grouping the pairings of candidate attributes with candidate values according to both a particular document in the second collection in which each pairing of candidate attributes with candidate values was identified and the underlying structure in the particular document in the second collection; and determining whether a particular pairing of a candidate attribute with a candidate value identified in the documents of the second collection of documents is in a group with a threshold number of pairings of candidate attributes with candidate values that have an attribute on the expanded attribute whitelist, and if so, including the particular pairing of a candidate attribute with a candidate value in the plurality of valid pairings of candidate attributes with candidate values.

9. The computer storage device of claim 6, where the score further reflects a number of attributes on the initial attribute whitelist that are in a group with the unique attribute.

10. The computer storage device of claim 6, wherein using the expanded attribute whitelist to identify valid pairings of candidate attributes with candidate values includes comparing a plurality of candidate pairings of candidate attributes with candidate values to attributes on the expanded attribute whitelist.

11. A system comprising:
one or more computers configured to perform operations comprising:
  obtaining an initial attribute whitelist, the initial attribute whitelist including one or more initial attributes;
  processing a first collection of documents, wherein each of the documents has content to be displayed and an underlying structure that defines how the content is to be displayed, to identify a plurality of pairings of candidate attributes with candidate values in the documents, wherein each candidate attribute and each candidate value is content found in the content to be displayed;
  grouping the candidate attributes into a plurality of groups according to both a particular document in the first collection in which each candidate attribute was extracted identified and the underlying structure in the particular document in the first collection in which each candidate attribute was identified;
  calculating a score for each unique attribute in the candidate attributes, where the score reflects a number of groups containing both the unique attribute and an attribute on the initial attribute whitelist;
  generating an expanded attribute whitelist, the expanded attribute whitelist including the initial attributes and each unique attribute having a respective score that satisfies a threshold; and
  using the expanded attribute whitelist to identify valid pairings of candidate attributes with candidate values.

12. The system of claim 11, where using the expanded attribute whitelist to identify valid pairings of candidate attributes with candidate values comprises:
  identifying a plurality of pairings of candidate attributes with candidate values from a second collection of documents, the pairings of candidate attributes with candidate values identified according to a respective structure of one or more of the documents in the second collection; and
  generating a plurality of valid pairings of candidate attributes with candidate values, the generating including, for each pairing of a candidate attribute with a candidate value, determining whether the respective candidate attribute is on the expanded attribute whitelist, and if the candidate attribute is on the expanded attribute whitelist, including the pairing of the candidate attribute with the candidate value in the plurality of valid pairings of candidate attributes with candidate values.

13. The system of claim 11, where using the expanded attribute whitelist to identify valid pairings of candidate attributes with candidate values comprises:
  processing a second collection of documents, wherein each of the documents has content to be displayed and an underlying structure that defines how the content is to be displayed, to identify a plurality of pairings of candidate attributes with candidate values, wherein each candidate attribute and each candidate value is content found in the content to be displayed;
  grouping the candidate attributes identified in the documents of the second collection of documents into a plurality of groups according to both a particular document in the second collection in which each candidate attribute was identified and the underlying structure of the particular document in the second collection; and
  determining whether a particular pairing of a candidate attribute with a candidate value identified in the documents of the second collection of documents is in a group with a threshold number of pairings of candidate attributes with candidate values that have an attribute on the expanded attribute whitelist, and if so, including the particular pairing of a candidate attribute with a candidate value in the plurality of valid pairings of candidate attributes with candidate values.

14. The system of claim 11, where the score further reflects a number of attributes on the initial attribute whitelist that are in a group with the unique attribute.

15. The system of claim 11, wherein using the expanded attribute whitelist to identify valid pairings of candidate attributes with candidate values includes comparing a plurality of candidate pairings of candidate attributes with candidate values to attributes on the expanded attribute whitelist.

16. A computer-implemented method, comprising:
  obtaining an initial attribute whitelist, the initial attribute whitelist including one or more initial attributes;
  processing a first collection of structured documents to identify structures in the structured documents;
  identifying a plurality of candidate attributes in the first collection of structured documents based on the identified structures in the structured documents in the first collection;
  grouping the candidate attributes into a plurality of groups according to both a particular structured document in the first collection from which each candidate attribute was extracted and a structure in the particular structured document in the first collection;
  calculating a score for each unique attribute in the candidate attributes, where the score reflects a number of groups containing the unique attribute and an attribute on the initial attribute whitelist, wherein the score for each unique attribute is calculated according to:

$$f(a) = \sum_{g \in G} n(a, g) \times n'(A, a, g),$$

where f(a) is the score for an attribute a, G is a set of all groups of candidate attributes, A is the initial attribute whitelist, n(a, g) is a number of times the attribute a appears in a group g, and n'(A, a, g) is the number of times any attribute in A, except a, appears in group g;

generating an expanded attribute whitelist, the expanded attribute whitelist including the initial attributes and each unique attribute having a respective score that satisfies a threshold; and using the expanded attribute whitelist to identify valid attribute-value pairs.

17. The method of claim 16, where using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection; and generating a plurality of valid attribute-value pairs, the generating including, for each candidate attribute-value pair, determining whether the candidate attribute-value pair has an attribute that is on the expanded attribute whitelist, including the candidate attribute-value pair in the plurality of valid attribute-value pairs.

18. The method of claim 16, wherein using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection;

grouping the candidate attribute-value pairs according to both a particular structured document in the second collection from which each candidate attribute-value pair was extracted and a corresponding structure of that structured document; and determining whether a candidate attribute-value pair is in a group with a threshold number of attribute-value pairs that have an attribute on the expanded attribute whitelist, and if so, including the candidate attribute-value pair in the plurality of valid attribute-value pairs.

19. The method of claim 16, wherein the score further reflects a number of attributes on the initial attribute whitelist that are in a group with the unique attribute.

20. A computer storage device having a computer program stored thereon, the computer program comprising instructions that when executed cause one or more computers to perform actions comprising:

obtaining an initial attribute whitelist, the initial attribute whitelist including one or more initial attributes;

processing a first collection of structured documents to identify structures in the structured documents;

identifying a plurality of candidate attributes in the first collection of structured documents based on the identified structures in the structured documents in the first collection;

grouping the candidate attributes into a plurality of groups according to both a particular structured document in the first collection from which each candidate attribute was extracted and a structure in the particular structured document;

calculating a score for each unique attribute in the candidate attributes, where the score reflects a number of groups containing the unique attribute and an attribute on the initial attribute whitelist, wherein the score for each unique attribute is calculated according to:

$$f(a) = \sum_{g \in G} n(a, g) \times n'(A, a, g),$$

where f(a) is the score for an attribute a, G is a set of all groups of candidate attributes, A is the initial attribute whitelist, n(a, g) is a number of times the attribute a appears in a group g, and n'(A, a, g) is the number of times any attribute in A, except a, appears in group g;

generating an expanded attribute whitelist, the expanded attribute whitelist including the initial attributes and each unique attribute having a respective score that satisfies a threshold; and using the expanded attribute whitelist to identify valid attribute-value pairs.

21. The computer storage device of claim 20, where using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection; and generating a plurality of valid attribute-value pairs, the generating including, for each candidate attribute-value pair, determining whether the candidate attribute-value pair has an attribute that is on the expanded attribute whitelist, and if the candidate attribute-value pair does have an attribute that is on the expanded whitelist, including the candidate attribute-value pair in the plurality of valid attribute-value pairs.

22. The computer storage device of claim 20, where using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection;

grouping the candidate attribute-value pairs according to both a particular structured document in the second collection from which each candidate attribute-value pair was extracted and a corresponding structure of that structured document; and determining whether a candidate attribute-value pair is in a group with a threshold number of attribute-value pairs that have an attribute on the expanded attribute whitelist, and if so, including the candidate attribute-value pair in the plurality of valid attribute-value pairs.

23. The computer storage device of claim 20, where the score further reflects a number of attributes on the initial attribute whitelist that are in a group with the unique attribute.

24. A system comprising:

one or more computers configured to perform operations comprising:

obtaining an initial attribute whitelist, the initial attribute whitelist including one or more initial attributes;

processing a first collection of structured documents to identify structures in the structured documents;

identifying a plurality of candidate attributes in the first collection of structured documents based on the identified structures in the structured documents in the first collection;

grouping the candidate attributes into a plurality of groups according to both a particular structured document in the first collection from which each candidate attribute was extracted and a structure in that structured document in the first collection;

calculating a score for each unique attribute in the candidate attributes, where the score reflects a number of groups containing the unique attribute and an attribute on the initial attribute whitelist; wherein the score for each unique attribute is calculated according to:

$$f(a) = \sum_{g \in G} n(a, g) \times n'(A, a, g),$$

where f(a) is the score for an attribute a, G is a set of all groups of candidate attributes, A is the initial attribute whitelist, n(a, g) is a number of times the attribute a appears in a group g, and n'(A, a, g) is the number of times any attribute in A, except a, appears in group g;

generating an expanded attribute whitelist, the expanded attribute whitelist including the initial attributes and each unique attribute having a respective score that satisfies a threshold; and using the expanded attribute whitelist to identify valid attribute-value pairs.

25. The system of claim 24, where using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection; and generating a plurality of valid attribute-value pairs, the generating including, for each candidate attribute-value pair, determining whether the candidate attribute-value pair has an attribute that is on the expanded attribute whitelist, and if the candidate attribute-value pair does have an attribute that is on the expanded attribute whitelist, including the candidate attribute-value pair in the plurality of valid attribute-value pairs.

26. The system of claim 24, where using the expanded attribute whitelist to identify valid attribute-value pairs comprises:

extracting a plurality of candidate attribute-value pairs from a second collection of structured documents, the candidate attribute-value pairs identified according to a respective structure of one or more of the structured documents in the second collection;

grouping the candidate attribute-value pairs according to both a particular structured document in the second collection from which each candidate attribute-value pair was extracted and a corresponding structure of that structured document; and determining whether a candidate attribute-value pair is in a group with a threshold number of attribute-value pairs that have an attribute on the expanded attribute whitelist, and if so, including the candidate attribute-value pair in the plurality of valid attribute-value pairs.

27. The system of claim 24, where the score further reflects a number of attributes on the initial attribute whitelist that are in a group with the unique attribute.

* * * * *

UNITED STATES PATENT AND TRADEMARK OFFICE
CERTIFICATE OF CORRECTION

| | | |
|---|---|---|
| PATENT NO. | : 8,645,391 B1 | Page 1 of 1 |
| APPLICATION NO. | : 12/497176 | |
| DATED | : February 4, 2014 | |
| INVENTOR(S) | : Yuk Wah Wong et al. | |

It is certified that error appears in the above-identified patent and that said Letters Patent is hereby corrected as shown below:

In the Claims

Claim 7, Column 16, Line 52-53 – delete "attribute value pair does have an attribute is" and insert -- attribute is --, therefor.

Claim 11, Column 17, Line 38 – delete "was extracted" and insert -- was --, therefor.

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,645,391 B1 | Page 1 of 1 |
| APPLICATION NO. | : 12/497176 | |
| DATED | : February 4, 2014 | |
| INVENTOR(S) | : Wong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this
Eleventh Day of August, 2015

Michelle K. Lee
*Director of the United States Patent and Trademark Office*